A. LOVSTAD.
HARROW.
APPLICATION FILED MAY 21, 1917.
1,268,861.
Patented June 11, 1918.
2 SHEETS—SHEET 2.
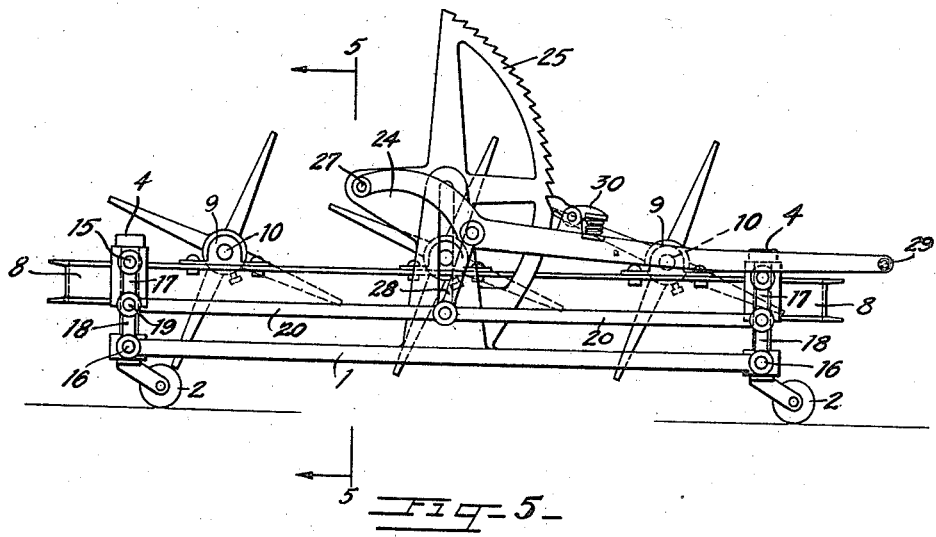
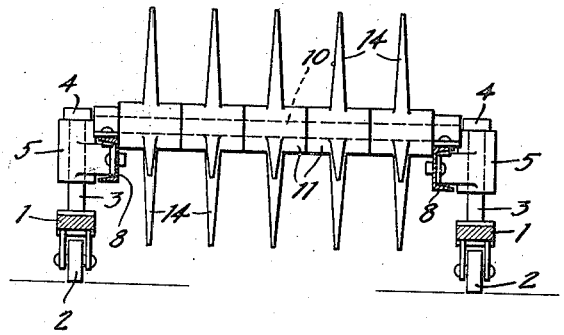
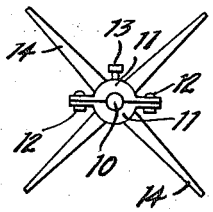
Witnesses:
Thomas J. Morgan
Grace C. Thompson.
Inventor
A. Lovstad
By H. J. Sanders
Atty.

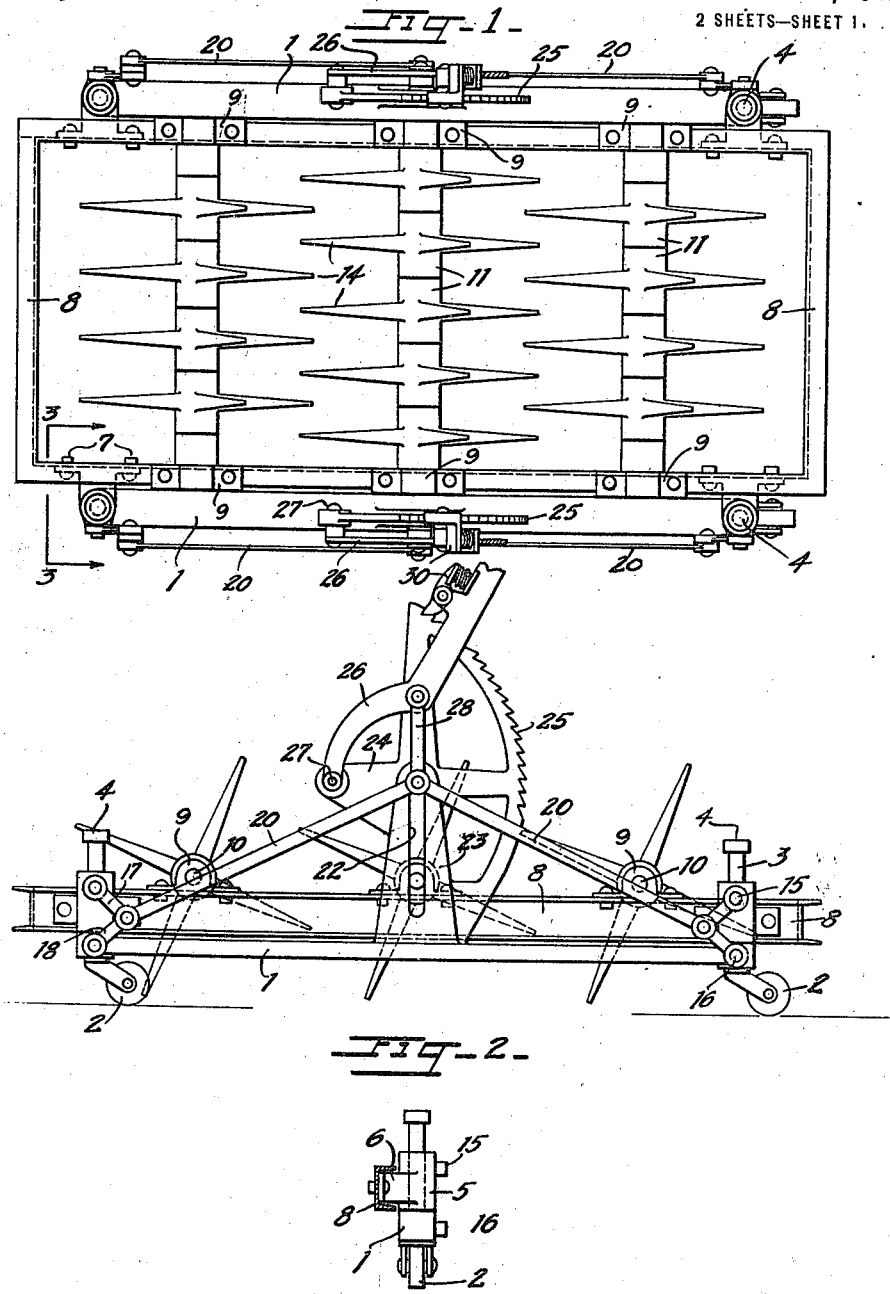

UNITED STATES PATENT OFFICE.

AUGUST LOVSTAD, OF ALGONA, IOWA.

HARROW.

1,268,861.

Specification of Letters Patent. Patented June 11, 1918.

Application filed May 21, 1917. Serial No. 170,007.

*To all whom it may concern:*

Be it known that I, AUGUST LOVSTAD, a citizen of the United States, residing at Algona, in the county of Kossuth and State of Iowa, have invented certain new and useful Improvements in Harrows, of which the following is a specification.

This invention relates to improvements in harrows. One object is to provide a harrow having a stationary frame and a relatively movable frame, the latter being carried by the former and being provided with the teeth, or knives so that adjustment of the movable frame will permit the formation, by the said knives or teeth, of deep or shallow furrows or will permit the knives or teeth to be raised entirely off the ground to permit removal of the machine from the field or to the field as desired. With the foregoing and other objects in view the invention consists in the combination and arrangement of parts to be hereinafter fully described, pointed out in the appended claims and illustrated in the accompanying drawings which form a part of this specification and in which—

Figure 1 is a plan view of my improved harrow with the frame-levers in section.

Fig. 2 is a side elevation of Fig. 1.

Fig. 3 is a section on line 3—3 of Fig. 1.

Fig. 4 is a view similar to Fig. 2 but with the movable parts in an altered position.

Fig. 5 is a section on line 5—5 of Fig. 4.

Fig. 6 is a front view of one of the harrow blades.

Like reference characters denote corresponding parts through the several views.

The reference numeral 1 denotes the stationary frame which is provided with the wheels 2 and with corner posts 3 having the heads 4. Upon each corner post 3 a sleeve 5 is slidably arranged, said sleeves being formed with spurs 6 which are secured by bolts 7 to the movable frame 8, the sides of which are preferably formed of the channel pieces or beams as shown. The said frame 8 carries the castings 9 that serve as bearings for the shafts 10 whereon the two piece sleeves 11, connected by bolts 12, are secured and retained in adjusted position by the set screws 13. The said sleeve sections 11 are formed with the teeth 14. Each sleeve 5 is formed with a lug 15 and immediately below the same a lug 16 is carried by the frame 1, said lugs being engaged by the links 17, 18 which links are also connected to a pin 19 which pin 19 is connected by a pitman 20 to a pin 21 slidably disposed in a vertical slot 22 formed in a casting 23 carried upon each side of the said frame 1 and rising a substantial distance thereabove. At each side of the machine there are two pitmen 20 which run to opposite ends of the machine as shown and that are connected to a pin 21. The said casting 23 comprises an integral arm 24 and a segmental rack 25.

A lever 26 fulcrumed at 27 to each arm 24 is connected by a link 28 to the said pin 21, said lever terminating in the handle 29. The said lever, further, is provided with the spring-pressed pawl 30 adapted to work over the teeth of the segment 25. In Fig. 2 the frame 8 is lowered with relation to the frame 1. To raise the frame 8 the operators, one at each side of the machine, move the levers 26 into the position shown in Fig. 4 thus moving the pitmen 20 into horizontal position and the links 17, 18 into vertical position and raising the sleeves 5, upon the posts 3, together with the frame 8. The dog 30 now engages one of the lower teeth of the rack 25 to prevent the frame 8 from returning to normal or lowered position with relation to the frame 1. By depressing the spring-engaged ends of the pawls to free said pawls from the racks 25 the frame 8, through gravity, will again move to lowered position shown in Fig. 2. It is obvious that the frame 8 may be retained in any intermediate position by resting the pawls 30 in engagement with any of the intermediate teeth of the racks 25.

What is claimed is:—

1. In a harrow comprising a wheeled frame, corner posts carried by said wheeled frame, sleeves slidable upon said corner posts, a second frame arranged above said wheeled frame and carried by said sleeves, teeth carried by said second frame, racks carried by said wheeled frame, levers associated with said racks, and connections between said levers, wheeled frame and sleeves whereby said sleeves may be moved relatively to said wheeled frame.

2. In a harrow comprising a wheeled frame, corner posts carried by said wheeled frame, sleeves slidable upon said corner posts, a second frame arranged above said wheeled frame and carried by said sleeves, teeth carried by said second frame, longitudinally slotted castings carried by said wheeled frame, segmental racks formed integral with said castings, levers fulcrumed to said castings for engagement with the said segmental racks, pins slidable in the slotted portions of said castings, links connecting the said levers and said pins, links pivotally connected and engaging said sleeves and the said wheeled frame, and connections between the said pivoted links and the said pin.

In testimony that I claim the foregoing as my own I have hereto affixed my signature in the presence of two subscribing witnesses.

AUGUST LOVSTAD.

Witnesses:
E. C. NELSEN,
G. J. F. VOGEL.

Copies of this patent may be obtained for five cents each, by addressing the "Commissioner of Patents, Washington, D. C."